United States Patent
Pylappan et al.

(10) Patent No.: US 9,453,734 B2
(45) Date of Patent: Sep. 27, 2016

(54) SMART LOADING OF MAP TILES

(71) Applicant: Apple Inc., Cupertino, CA (US)

(72) Inventors: Seejo K. Pylappan, Cupertino, CA (US); James A. Howard, Mountain View, CA (US); Bradford A. Moore, San Francisco, CA (US); Christopher Blumenberg, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 13/705,997

(22) Filed: Dec. 5, 2012

(65) Prior Publication Data

US 2013/0325317 A1    Dec. 5, 2013

Related U.S. Application Data

(60) Provisional application No. 61/655,941, filed on Jun. 5, 2012.

(51) Int. Cl.
*G01C 21/26* (2006.01)
*G01C 21/36* (2006.01)
(Continued)

(52) U.S. Cl.
CPC ............ *G01C 21/26* (2013.01); *G01C 21/32* (2013.01); *G01C 21/3667* (2013.01); *G06F 17/30241* (2013.01); *G09B 29/003* (2013.01); *G09B 29/005* (2013.01)

(58) Field of Classification Search
CPC .. G01C 21/26; G01C 21/32; G01C 21/3667; G09B 29/005; G09B 29/003; G06F 17/30241
USPC ....... 701/409, 411, 421, 430, 452, 454, 460, 701/461, 462, 9; 345/428, 530, 548, 557, 345/571, 214, 211, 698, 692; 715/815, 855, 715/864
See application file for complete search history.

(56) References Cited

U.S. PATENT DOCUMENTS 4,484,192 A * 11/1984 Seitz et al. ............... 340/995.18
5,170,165 A * 12/1992 Iihoshi ................. G09B 29/106
340/995.22
(Continued)

FOREIGN PATENT DOCUMENTS

EP    1737160 A1    12/2006
EP    2031352 A1    3/2009
(Continued)

OTHER PUBLICATIONS

Kjaergaard, Location Based Services on Mobile Phone: Minimizing Power Consumption, 2012.*
(Continued)

*Primary Examiner* — Fadey Jabr
*Assistant Examiner* — Angelina Shudy
(74) *Attorney, Agent, or Firm* — Kilpatrick Townsend & Stockton LLP

(57) ABSTRACT

Systems and methods are provided for displaying a portion of a map on a mobile device of a user while the user is traveling along a route. The mobile device can use a selected route and a current location of the device to load map tiles for parts of the map that are upcoming along the route. In this manner, the user can have quick access to the portions of the map that the user likely will want to view. For example, the map tiles can be loaded for the next 50 Km, and then when the stored tiles reaches only 25 Km ahead, another 25 Km of tiles can be retrieved. The amount of tiles loaded (e.g., minimum and maximum amounts) can vary based on a variety of factors, such as network state, distance traveled along the route, and whether the mobile device is charging.

23 Claims, 9 Drawing Sheets

(51) Int. Cl.
*G09B 29/00* (2006.01)
*G01C 21/32* (2006.01)
*G06F 17/30* (2006.01)

(56) References Cited

U.S. PATENT DOCUMENTS

| | | | | |
|---|---|---|---|---|
| 5,694,322 | A * | 12/1997 | Westerlage | G01C 21/26 340/870.07 |
| 5,731,978 | A * | 3/1998 | Tamai | G01C 21/3461 340/988 |
| 6,122,593 | A * | 9/2000 | Friederich | G01C 21/32 701/23 |
| 6,184,823 | B1 * | 2/2001 | Smith | G01C 21/32 342/357.31 |
| 6,246,955 | B1 * | 6/2001 | Nishikawa | G08G 1/093 701/117 |
| 6,249,740 | B1 * | 6/2001 | Ito | G01C 21/34 340/910 |
| 6,622,085 | B1 * | 9/2003 | Amita et al. | 340/995.14 |
| 6,850,840 | B1 * | 2/2005 | Willenbrock | G09B 29/006 340/910 |
| 7,197,500 | B1 * | 3/2007 | Israni et al. | 707/809 |
| 7,363,126 | B1 * | 4/2008 | Zhong et al. | 701/25 |
| 7,941,272 | B2 * | 5/2011 | Karaoguz et al. | 701/412 |
| 8,010,227 | B2 * | 8/2011 | Elliott | G01C 21/32 455/414.2 |
| 8,498,778 | B2 * | 7/2013 | Seymour | B60Q 1/346 211/175 |
| 8,711,181 | B1 * | 4/2014 | Nourse et al. | 345/660 |
| 8,849,942 | B1 * | 9/2014 | Foster | G06F 12/0862 709/213 |
| 8,880,336 | B2 * | 11/2014 | van Os | G01C 21/3635 345/173 |
| 9,071,641 | B2 * | 6/2015 | Sakka | H04L 67/18 |
| 9,146,125 | B2 * | 9/2015 | Vulcano | G08G 1/0969 |
| 2002/0169778 | A1 | 11/2002 | Natesan et al. | |
| 2003/0191583 | A1 * | 10/2003 | Uhlmann | B61L 29/24 701/409 |
| 2004/0260461 | A1 * | 12/2004 | Sato | G01C 21/26 701/516 |
| 2005/0149251 | A1 * | 7/2005 | Donath | G01C 21/26 701/532 |
| 2006/0224316 | A1 * | 10/2006 | Ishida | G01C 21/3641 701/425 |
| 2006/0286988 | A1 * | 12/2006 | Blume et al. | 455/456.1 |
| 2007/0225910 | A1 * | 9/2007 | Fujiwara | G01C 21/3605 701/425 |
| 2007/0296684 | A1 * | 12/2007 | Thomas et al. | 345/102 |
| 2008/0109159 | A1 * | 5/2008 | Shi et al. | 701/208 |
| 2008/0132249 | A1 * | 6/2008 | Hamilton | 455/456.3 |
| 2009/0063042 | A1 * | 3/2009 | Santesson et al. | 701/209 |
| 2009/0182500 | A1 * | 7/2009 | Dicke | 701/208 |
| 2009/0281718 | A1 * | 11/2009 | Gibran et al. | 701/200 |
| 2009/0287750 | A1 * | 11/2009 | Banavar et al. | 707/204 |
| 2009/0292462 | A1 * | 11/2009 | Babetski | 701/201 |
| 2009/0300528 | A1 * | 12/2009 | Stambaugh | 715/764 |
| 2009/0326810 | A1 | 12/2009 | Callaghan et al. | |
| 2010/0091677 | A1 * | 4/2010 | Griff et al. | 370/252 |
| 2010/0106403 | A1 * | 4/2010 | Elliott | 701/201 |
| 2010/0106409 | A1 * | 4/2010 | Karaoguz et al. | 701/208 |
| 2010/0106801 | A1 * | 4/2010 | Bliss et al. | 709/219 |
| 2010/0153007 | A1 * | 6/2010 | Crowley | 701/206 |
| 2011/0173066 | A1 * | 7/2011 | Simmons | 705/14.49 |
| 2011/0196609 | A1 * | 8/2011 | Karaoguz et al. | 701/208 |
| 2011/0199479 | A1 * | 8/2011 | Waldman | G01C 21/3602 348/116 |
| 2012/0075337 | A1 * | 3/2012 | Rasmussen et al. | 345/629 |
| 2012/0245849 | A1 * | 9/2012 | Spindler | G01C 21/32 701/533 |
| 2012/0324378 | A1 * | 12/2012 | Stambaugh | 715/764 |
| 2013/0103314 | A1 * | 4/2013 | Moore | G01C 21/3676 701/533 |
| 2013/0147846 | A1 * | 6/2013 | Kalai et al. | 345/660 |
| 2013/0173159 | A1 * | 7/2013 | Trum et al. | 701/533 |
| 2013/0311910 | A1 * | 11/2013 | Stambaugh | 715/760 |
| 2013/0321400 | A1 * | 12/2013 | van Os et al. | 345/419 |
| 2013/0321401 | A1 * | 12/2013 | Piemonte et al. | 345/419 |
| 2013/0321450 | A1 * | 12/2013 | Hultquist et al. | 345/619 |
| 2013/0322702 | A1 * | 12/2013 | Piemonte et al. | 382/113 |
| 2013/0325342 | A1 * | 12/2013 | Pylappan | G10L 21/00 701/533 |
| 2013/0326407 | A1 * | 12/2013 | van Os | G01C 21/00 715/810 |
| 2013/0328862 | A1 * | 12/2013 | Piemonte | 345/419 |
| 2013/0328879 | A1 * | 12/2013 | Carbonneau | G01C 21/32 345/440 |
| 2013/0328916 | A1 * | 12/2013 | Arikan | G06T 11/20 345/619 |
| 2013/0332056 | A1 * | 12/2013 | Huang et al. | 701/117 |
| 2013/0345975 | A1 * | 12/2013 | Vulcano | G01C 21/3632 701/533 |
| 2014/0005933 | A1 * | 1/2014 | Fong | G05D 1/0274 701/447 |
| 2014/0024354 | A1 * | 1/2014 | Haik et al. | 455/418 |
| 2014/0109113 | A1 * | 4/2014 | Stacy et al. | 719/318 |
| 2014/0232570 | A1 * | 8/2014 | Skinder | G01C 21/165 340/989 |
| 2015/0351073 | A1 * | 12/2015 | Ball | H04W 4/001 455/414.2 |
| 2016/0025497 | A1 * | 1/2016 | Baalu | G01C 21/005 701/430 |

FOREIGN PATENT DOCUMENTS

| | | |
|---|---|---|
| EP | 2120014 A1 | 11/2009 |
| EP | 2196772 A1 | 6/2010 |
| JP | 4345255 B2 * | 10/2009 |
| WO | 2008/070400 A2 | 6/2008 |

OTHER PUBLICATIONS

International Search Report and Written Opinion mailed Jul. 26, 2013 in PCT/US2013/040276, 12 pages.
International Preliminary Report on Patentability for International PCT Application No. PCT/US2013/040276, mailed Dec. 18, 2014, 9 pages.

* cited by examiner

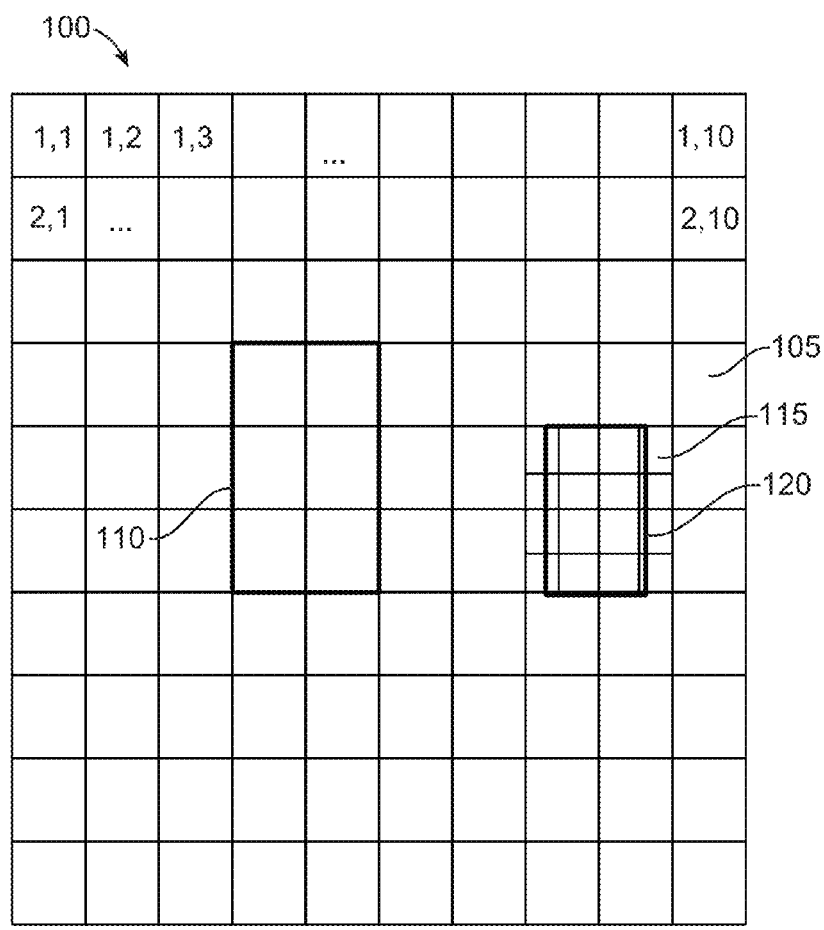
FIG. 1A
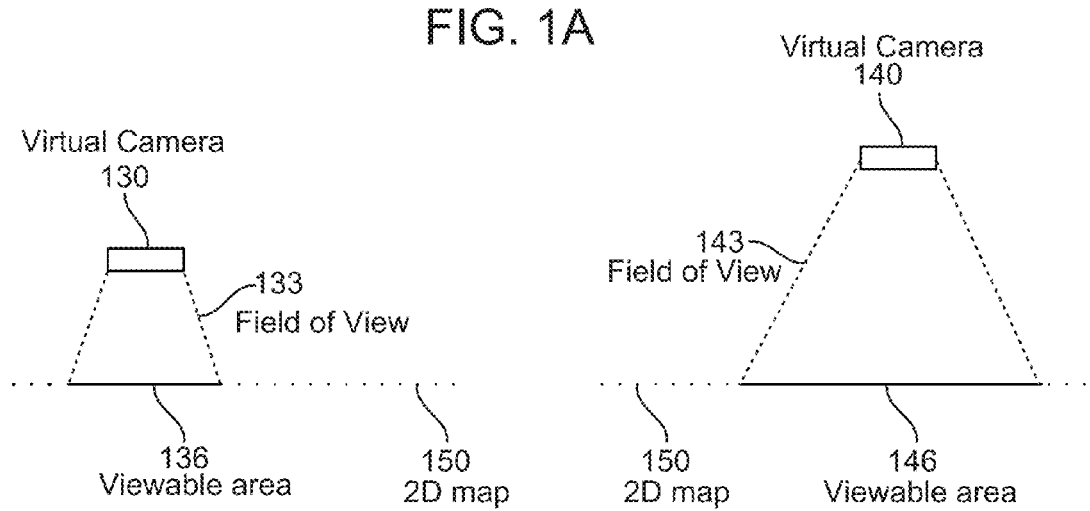
FIG. 1B
FIG. 1C

| Network | Charging | Committed to Route | Min distance of tiles stored | Max distance of tiles stored |
|---|---|---|---|---|
| None | * | * | 0 | 0 |
| Bad | 0 | 0 | 10 | 20 |
| Bad | 1 | 0 | 20 | 30 |
| Bad | 0 | 1 | 20 | 30 |
| Bad | 1 | 1 | 50 | 100 |
| Good | 0 | 0 | 25 | 50 |
| Good | 1 | 0 | 25 | 50 |
| Good | 0 | 1 | 100 | 200 |
| Good | 1 | 1 | 300 | 400 |
| Wi-Fi | 0 | 0 | 100 | 200 |
| Wi-Fi | 1 | 0 | 1000 | 1000 |
| Wi-Fi | 0 | 1 | 100 | 200 |
| Wi-Fi | 1 | 1 | 1000 | 1000 |

FIG. 7

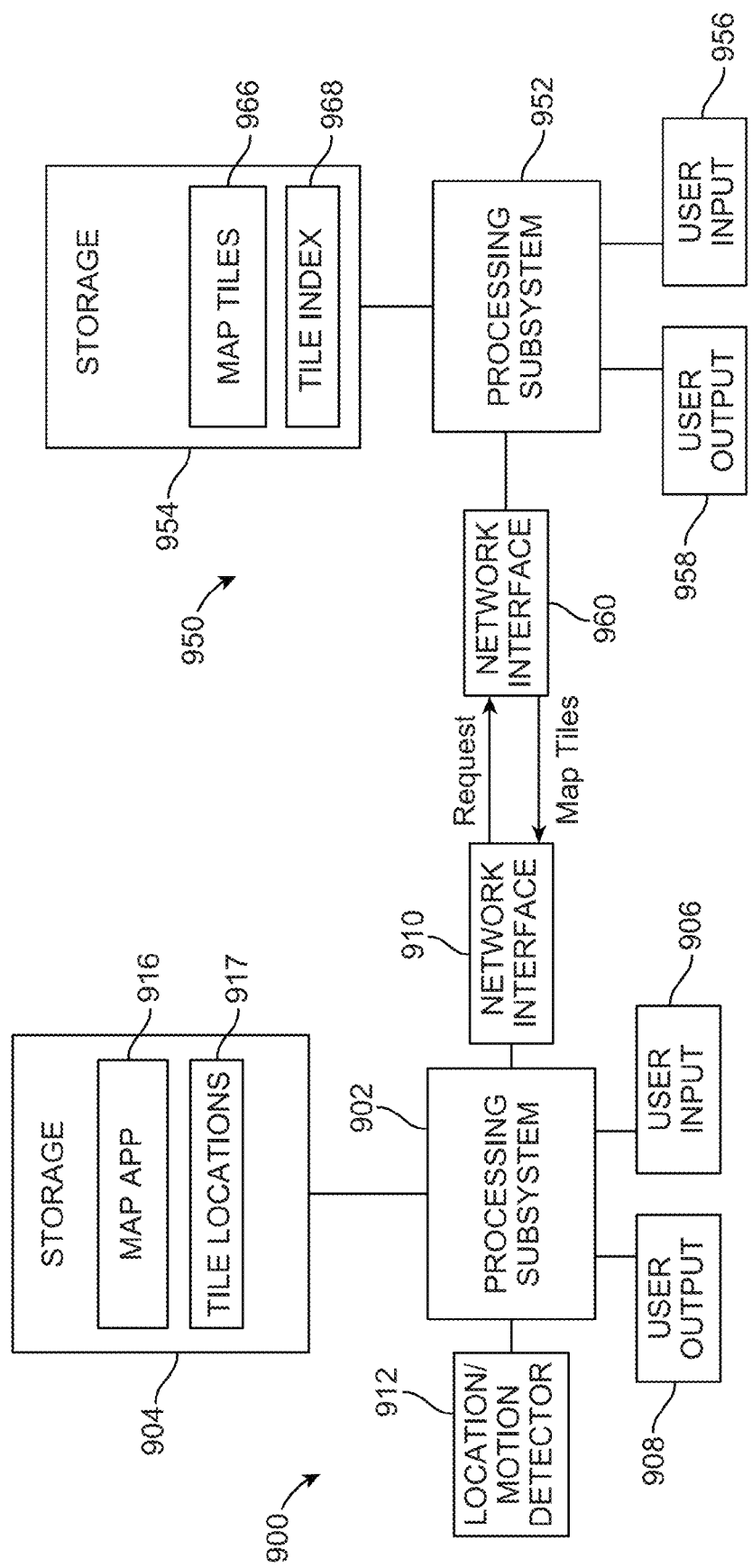

SMART LOADING OF MAP TILES

CROSS-REFERENCES TO RELATED APPLICATIONS

The present application claims priority from and is a nonprovisional application of U.S. Provisional Application No. 61/655,941 entitled "SMART LOADING OF MAP TILES" filed Jun. 5, 2012, the entire contents of which are herein incorporated by reference for all purposes.

BACKGROUND

The present disclosure is generally related to loading map tiles for viewing in a map application of a mobile device, and more specifically to loading the tiles in anticipation of a particular route.

Many mobile devices (e.g., a smartphone) have a map application that allows a user to view different geographical areas for certain purposes, such as to navigate roads in a certain area, to find out traffic conditions on certain roads, or to find locations of certain stores. A user navigates within the map application to see different areas to zoom out or zoom in to see the map at different resolutions. A user may navigate the map in various ways, such as by using a touch screen. Typically, the mobile device does not store the map, but instead requests map tiles from a server. The requested map tiles would correspond to the geographic area that the user has selected.

When a user is traveling to a particular destination, e.g., on a road trip, the user may often want to use the map feature. For instance, the user may use the map to determine where to turn next to get to the destination. The might also want to find out information about an exit, e.g., if there is a gas station there or type of restaurants. Or, a user may become lost, and need to use the map to correct course to the destination. However, to do so, the user currently navigates the map application to the desired geographic area to retrieve the desired map tiles from the server. Obtaining map tiles in such a way can encounter delay, connectivity problems, and run down battery life.

Therefore, it is desirable to provide methods and system for obtaining desired map tiles from a map server in a more reliable and efficient manner.

BRIEF SUMMARY

Embodiments can provide systems and methods for displaying a portion of a map on a mobile device of a user while the user is traveling along a route. The mobile device can use a selected route and a current location of the device to load map tiles for parts of the map that are upcoming along the route. In this manner, the user can have quick access to the portions of the map that the user likely will want to view. For example, the map tiles can be loaded for the next 50 Km, and then when the stored tiles reaches only 25 Km ahead, another 25 Km of tiles can be retrieved. The amount of tiles loaded (e.g., minimum and maximum amounts) can vary based on a variety of factors, such as network state, distance traveled along the route, and whether the mobile device is plugged into a charger.

According to one embodiment, a method displays a portion of a map on a mobile device of a user while the user is traveling along a route. The mobile device receives a selection of a route. Indicia of a plurality of map tiles along the route are identified by an application executing on a processor of the mobile device. The identified map tiles are not within a currently selected view of the map being displayed on a display of the mobile device. A location of the mobile device relative to the route is identified. The mobile device sends a request to a map server for the identified map tiles. The request is sent in response to less than a minimum amount of map tiles, corresponding to the route remaining to be traveled, being stored in memory of the mobile device. The mobile device receives the requested map tiles from the map server for displaying on the mobile device.

Other embodiments are directed to systems, portable consumer devices, and computer readable media associated with methods described herein.

BRIEF DESCRIPTION OF THE DRAWINGS

FIG. 1A shows a grid 100 corresponding to the map tiles of a two-dimensional (2D) map. FIG. 1B shows a side view of a virtual camera 130 at a first height above the 2D map 150, which contains the grid for indexing the map tiles. FIG. 1C shows a virtual camera 140 at a second larger height from 2D map 150.

FIG. 7 shows a table 700 illustrating different minimum and maximum amounts of map tiles to be stored based on three example variables according to embodiments of the present invention.

FIG. 9A is a simplified block diagram of an implementation of a device 900 according to an embodiment of the present invention. FIG. 9B is a simplified block diagram of an implementation of map server 950 according to an embodiment of the present invention.

DETAILED DESCRIPTION

Figure 2:
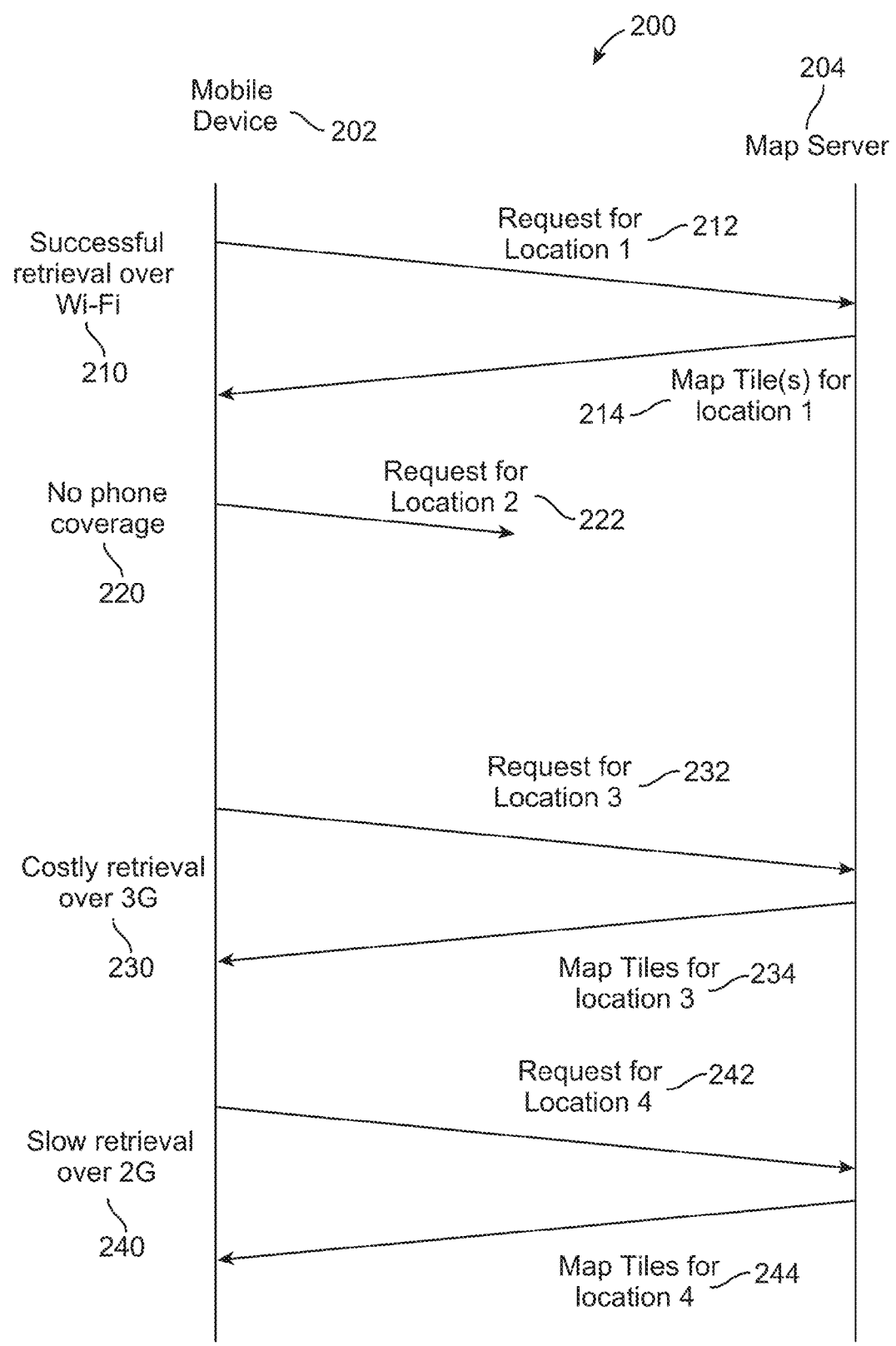
FIG. 2 shows a swim diagram of communications of a mobile device 202 with a map server 204 illustrating problems with retrieving map tiles from map serve 204 when being viewed.

When a user is on a road trip, the user may often want to view a map on a mobile device (e.g., a smartphone). For instance, the user may use the map to determine where to turn next to get to the destination. Or, a user may become lost, and need to use the map to correct course to the destination. However, to do so, the user currently navigates the map application to the desired geographic area to retrieve the desired map tiles from the server. Obtaining map tiles in such a way can encounter delay, connectivity problems, and run down battery life. Embodiments can address such problems.

The mobile device can use a selected route and a current location of the device to load map tiles for parts of the map that are upcoming along the route. In this manner, the user can have quick access to the portions of the map that the user likely will want to view. For example, the map tiles can be loaded for the next 50 Km, and then when the stored tiles reaches only 25 Km ahead, another 25 Km of tiles can be retrieved. The amount of tiles loaded (e.g., minimum and maximum amounts) can vary based on a variety of factors, such as network state, distance traveled along the route, and whether the mobile device is plugged into a charger.

I. Retrieving Map Tiles from Map Server

As mentioned above, a mobile device (e.g., a smartphone) can execute a map application to allow a user to view different part of a two-dimensional (2D) map. For example, the user can change the part of the map displayed on a screen of the mobile device by swiping the screen to move the view. This movement of the view is a result of a movement of a virtual camera that defines what is being displayed. Once the map application identifies the new position of the virtual camera, the viewable part of the map can be identified and the map tiles of the viewable part of the map can be requested from a map server. To identify the required map tiles (also referred to as "tiles"), the mobile device can provide an index of the map tiles by referring to a grid that is shared by the mobile device and the map server.

FIG. 1A shows a grid 100 corresponding to the map tiles of a two-dimensional (2D) map. As shown, the map tiles are indexed by row and column, but other indexing (e.g., by sequential numbers) can be used. One position of the viewing area on a mobile device is shown as box 110. Bounding box 110 can be moved around to see different parts of the map. For example, a user can move the box in directions using a keypad, touch screen, or other suitable controls. As another example, the user could enter a search term corresponding to a particular location or select a current location, and a map application (or "app") can position the box over the selected area using default settings (e.g., default zoom settings).

The mobile device can store the indexed array 100 so that the device can identify which tiles are needed from a server. For example, at position 110, the device needs the map tiles (i.e. the graphic information of the map) corresponding to grid sections (4,4), (4,5), (5,4), (5,5), (6,4), and (6,5). Once the device identifies these grid sections, the device can request the corresponding map tiles from the map server. The grid section and tiles can be of any suitable shape. In one implementation, the grid can be defined by a latitude and longitude for the boxes.

As another example, if the user moves the view to a position of bounding box 120, the device would need grid sections (5,8), (5,9), (6,8), and (6,9). However, bounding box 120 is at a higher resolution, as signified by a smaller box for displaying on a screen of the device. With the higher resolution, a different set of map tiles may be used, i.e., corresponding to a finer grid. Map tiles 115 are shown with the finer grid. As with bounding box 120, only part of a tile may be displayed. Thus, any tile that is at least partially within the viewable area would be retrieved.

Accordingly, a bounding box (i.e. the size of the view) can be made larger or smaller, where there can be less resolution when the box is bigger. In one embodiment, when the map is made larger or smaller, a resolution setting is determined, and the device can then request the indices of a map at that particular resolution (e.g., corresponding to map tiles 115 as opposed to the larger map tiles 105). It is also possible that different maps may be used at different resolutions. For example, different resolutions would have different sets of map tiles As examples, the server can determine which map tiles to provide based on a submitted resolution or the size of the box. The resolution can be determined by how far away a virtual camera is from a surface that defines the 2D map.

FIG. 1B shows a side view of a virtual camera 130 at a first height above the 2D map 150, which contains the grid for indexing the map tiles. The height can be referred to a Z-direction, with X,Y coordinates being the map coordinates of the 2D map. As shown, virtual camera 130 is viewing the map from directly above. At the first height, virtual camera 130 has a field of view 133 that intersects 2D map 150 to define the viewable area 136 of the map given the position of virtual camera 130. Field of view 133 is shown as two lines where the viewable area is within the two lines. The field of view can be defined in various ways, e.g., the perimeter of an expanding circle, or other geometric shape. The viewable area 136 can be of a different shape than the screen on which the image is displayed. The device can identify the parts of the viewable area that fall within the screen size, and just request those tiles.

FIG. 1C shows a virtual camera 140 at a second larger height from 2D map 150. Since virtual camera 140 is farther away from 2D map 150, a field of view 143 does not intersect 2D map 150 until later. Thus, viewable area 146 is larger. A user might select this position of virtual camera 140 by zooming out. As mentioned above, when a user zooms in or zoom out, the different resolution can use a different set of map tiles. In one implementation, some of the map tiles from one resolution can be used to render an image at a different resolution. For instance, map tiles at a finer resolution can be used to render views at a lower resolution (e.g., certain features can be removed as one zooms out). It also can be possible to add more information to map tiles at the lower resolution to obtain the finer resolution, thereby being able to re-use the map information already loaded at the lower resolution. In another implementation, the map tiles from one resolution are not re-used to rendering another image at another resolution.

The map tiles may store metadata associated with particular locations with the map tile. For example, information about stores at particular locations, and information about the stores. Map tiles may be retrieved at various times. For example, a user can simply enjoy maps and move around the virtual camera. The user might be looking for a restaurant around where he/she lives. One example is for determining a route from one location to another, where the route typically is by automobile, but could be by other modes of transportation, such as bicycle, hiking, train, etc.

II. Problems with Retrieving Tiles while En Route

When a user of the mobile device is traveling along a route, the user will often check a map in the vicinity of a current location. As mentioned above, a user would typically move the map to the vicinity, thereby providing a request for the corresponding map tiles. However, requesting and retrieving map tiles from the map server as one needs them can cause problems. For example, there may not be sufficient phone coverage (i.e., insufficient network connectivity) in the current location, and thus the mobile device may not be able to retrieve the map tiles. If the mobile device is constantly trying to connect and requesting the data often, then the antenna will be in a high energy state, which will drain the battery. The user also may end up paying higher costs depending on when the map tiles are downloaded, e.g., which network is used. These problems are highlighted in FIG. 2.

FIG. 2 shows a swim diagram of communications of a mobile device 202 with a map server 204 illustrating problems with retrieving map tiles from map serve 204 when being viewed. The arrows from mobile device 202 to map server 204 are requests for map tiles corresponding to the current view (i.e., the current position of the virtual camera). The arrows from map server 204 to mobile device 202 signify a transmission of the requested map tiles. Four different sets of communications or communication attempts are shown on the left as 210, 220, 230, and 240.

Communication 210 shows a successful request 212 and retrieval 214 of map tiles for location 1 from map server 204 over a Wi-Fi connection (IEEE 802.11 standard). For communication 210, the request might be made when the person is at home (e.g., using a home Internet connection), and be for the vicinity around the user's home (location 1). Since the retrieval is over Wi-Fi, the cost to a user is essentially free, as Wi-Fi would normally be an unlimited amount of data. If the phone was charged, then the battery would not be drained by the retrieval of the tiles.

For communication 220, there is no phone coverage, and thus request 222 for the map for location 2 is shown as not being received by map server 204. The result is that the user does not obtain the requested map tiles. If the user were to look for a gas station, restaurant, or just simply road information (e.g., due to a detour) then the user would be without such useful information.

For communication 230, the user is able to send request 232 and retrieve 234 the map tiles for location 3 over a 3G network connection. But, the retrieval is over a 3G network, and would count against the user's data plan. Often a user has a data plan with a limited amount of bytes, and thus may have to pay more for bytes over the limit. Thus, communication 230 is not ideal as the retrieval can use up a certain number of bytes of the user's data plan. Also, the mobile device may have been searching for a network connection since request 222 was sent. Such searching for a network connection can drain the battery.

For communication 240, request 242 and retrieval 244 for the map tiles for location 4 is over a 2G network connection. In such a case, the data would be retrieved at a slower rate, and thus the antenna may need to be in a high energy state for longer time to retrieve the data. This can increase the battery usage. Additionally, making many requests to get the map tiles for each location can drain the battery. Such problems can be addressed by embodiments of the present invention.

III. Pre-Loading Tiles Along Route

If a user selects a route on the mobile device, the route can be used to identify map tiles that the user will likely request. These identified map tiles can be retrieved from the map server and loaded onto the mobile device in anticipation of the user actually moving the virtual camera to view the identified map tiles. In this manner, the map application can quickly display the needed map tiles, even if there is no network connection. The pre-loading of map tiles can also be done in a cost effective and energy efficient manner. In various embodiments, the map tiles of the entire route, just a predetermined amount for the immediate route ahead, or variable amounts of the route ahead can be loaded before the user travels to the locations corresponding to the map tiles. In one implementation, the downloading of tiles is started when a user selects "start" or other similar button to start the trip.

A. Viewing Route and Pre-Loaded Tiles

Figure 3:
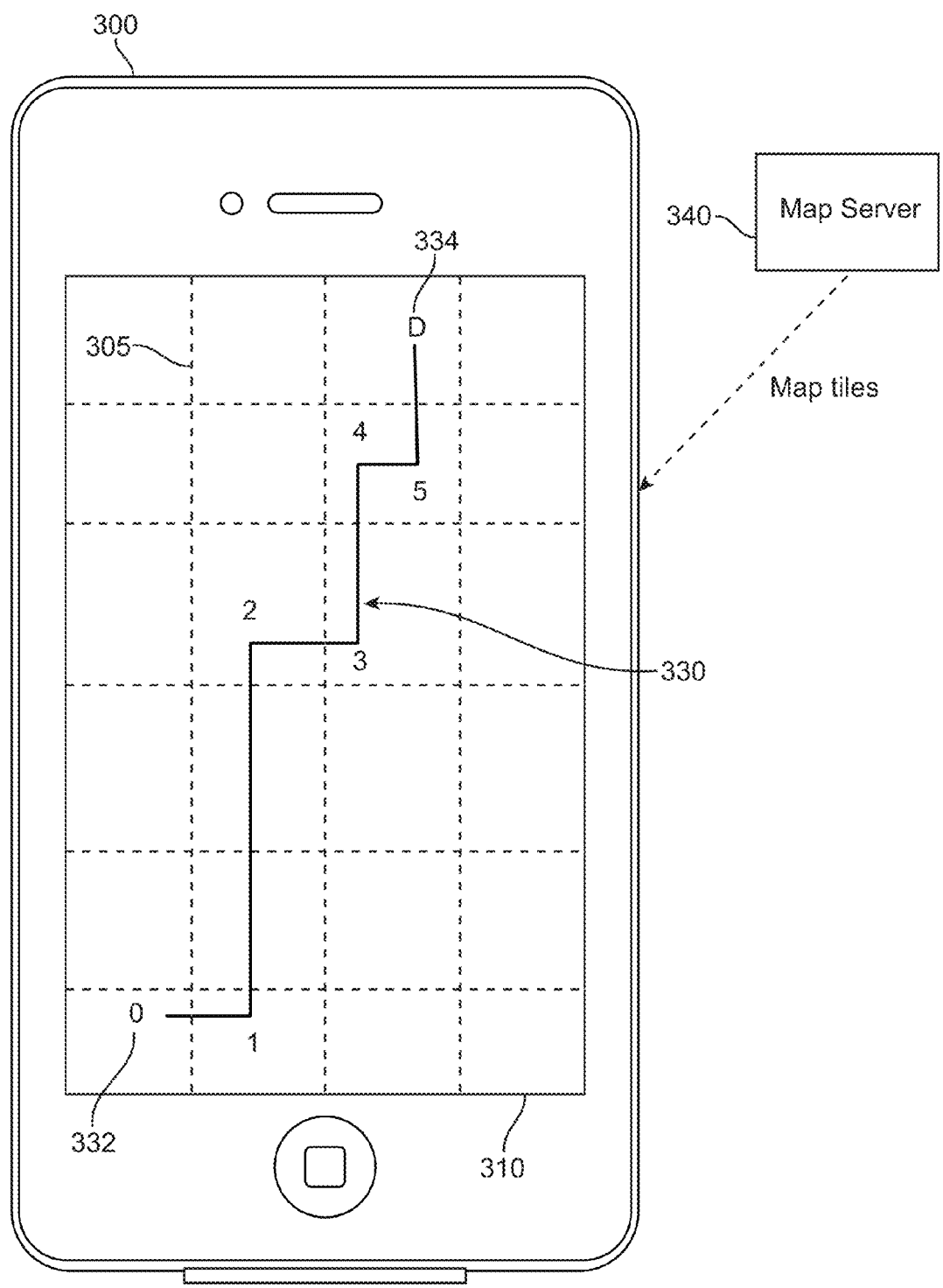
FIG. 3 shows a route 330 being selected on a mobile device 300 according to embodiments of the present invention.

FIG. 3 shows a route 330 being selected on a mobile device 300 according to embodiments of the present invention. Mobile device has a screen 310, which can define a bounding box for viewing the map. The selected route 330 has a start 332 and a destination 334. Route 330 has five decision points, marked with number 1 to 5. A grid 305 is shown with dotted lines underneath route 330.

The route could be selected in a variety of ways. The user could search for a destination in a variety of ways, e.g., by inputting an address or entering a search term and selection a result on the map. A starting location could be picked in a similar manner. A location/motion detector could be used to identify a current location of the mobile device (e.g., using global positioning system (GPS)), and this location could be used as starting location 332. Multiple routes could be displayed, and the user could then select one.

In one embodiment, once the route has been selected, the mobile device 300 can load the map tiles corresponding to route 330 from map server 340. For example, if a user were using the mobile device at home with a Wi-Fi connection while plugged into a wall socket for charging, the map application could determine that all of the map tiles of the route be downloaded. For illustration purposes, the grid 305 is shown at a lower resolution, than a default resolution (e.g., as determined by a default height of the virtual camera) for selecting map tiles. Thus, the number of map tiles would be greater than the eight grid tiles shown. Once, the map tiles were loaded into a local memory of device 300, the map tiles can be retrieved from local memory for viewing, instead of having to download from map server 340.

Figure 4B:
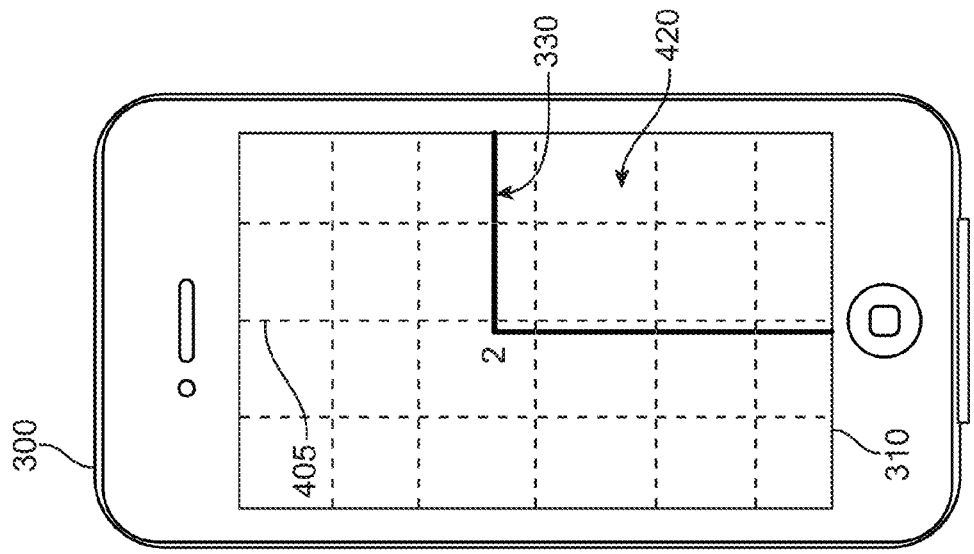
FIGS. 4A and 4B show views along the route using map tiles that were loaded based on the selection of route 330 in FIG. 3.
Figure 4A:
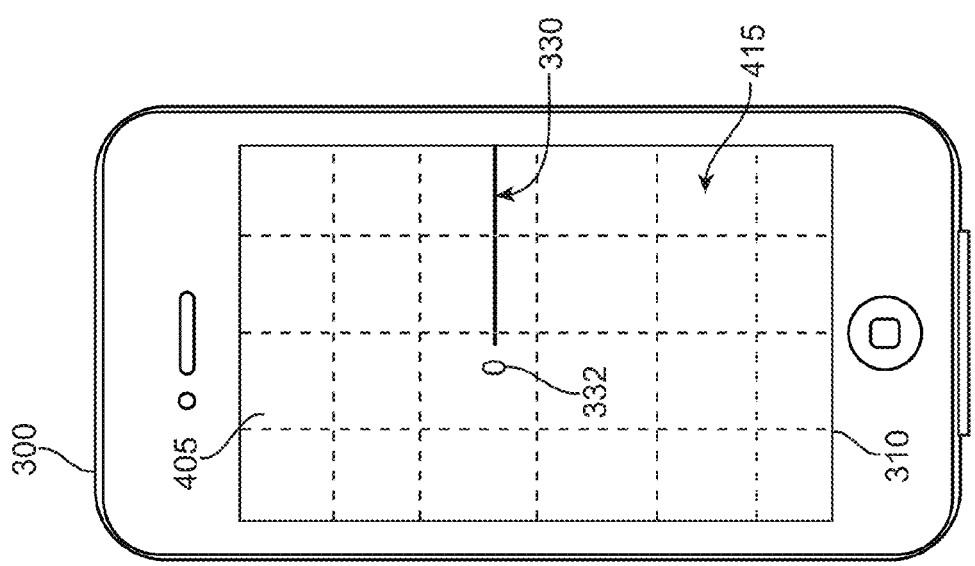

FIGS. 4A and 4B show views along the route using map tiles that were loaded based on the selection of route 330 in FIG. 3. FIG. 4A shows a view 415 around the starting location 332. View 415 is at a higher resolution than that shown in FIG. 3 for the entire route. This resolution may be the default resolution for identifying the map tiles to retrieve. In other embodiments, a user can select the resolution desired for the map tiles to be loaded.

If each grid section 405 corresponds to a map tile, and each grid section shown has a map tile already loaded, then view 415 could be displayed very quickly by accessing the local memory. However, not all of the map tiles are required before at least part of view 415 is displayed. For example, the map tiles in the bottom row might not be stored in local memory, but the rest of the map tiles could be displayed right away. The missing tiles could be retrieved, depending on the settings of the map application.

FIG. 4B shows a view 420 around decision point 2. If the user missed the right turn at decision point 2, the map tiles in the vicinity of decision point 2 would already be available in local memory. Thus, the user would not have to wait for the map tiles to be retrieved from the map server, and the user could be back on course sooner. The map application could also have a navigation feature that determines a correction when the user deviates from the established route (e.g., if the user misses a decision point), and can provide directions (e.g., verbal and/or visual instructions) to get back onto the established route. Once the trip is completed, the map application could purge the map tiles from memory in order free up memory space. Such freeing up of memory could occur based on a need for storing other information, including new map tiles (e.g., for the route of a new trip).

B. Method

Figure 5:
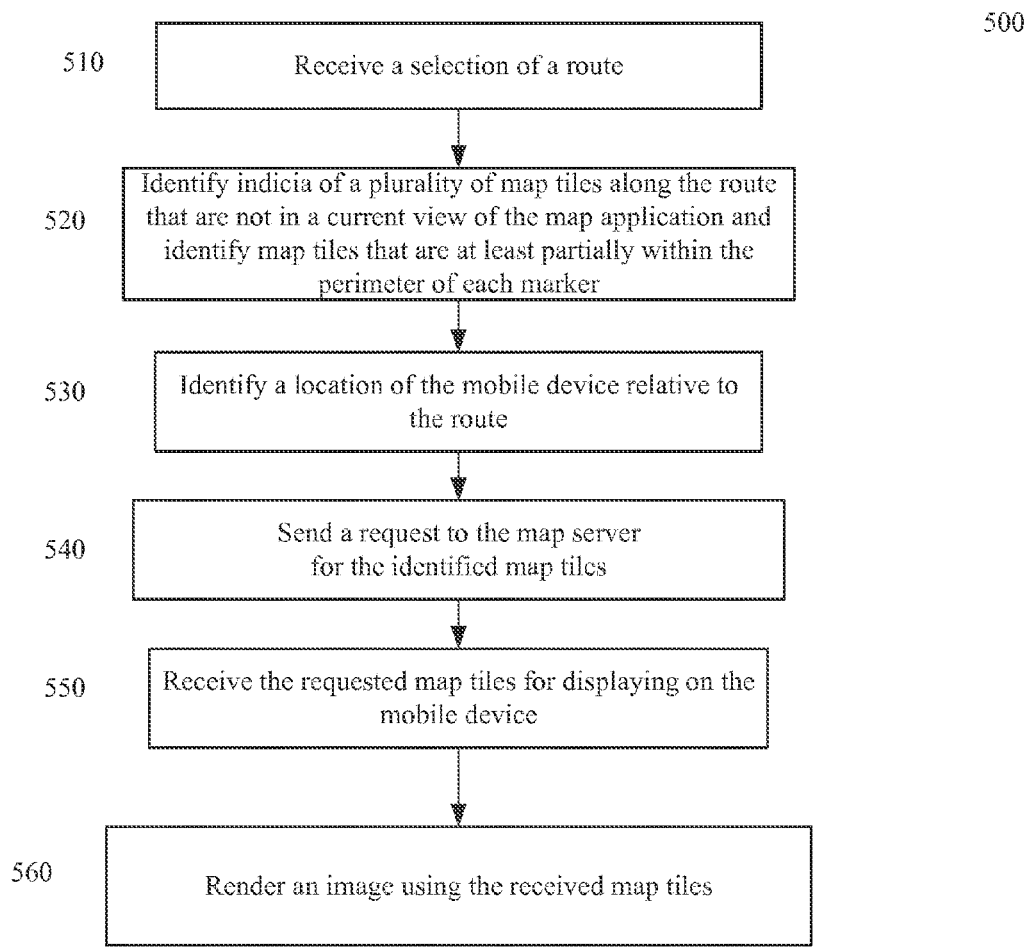
FIG. 5 is a flowchart of a method 500 for displaying a portion of a map on a mobile device of a user while the user is traveling along a route according to embodiments of the present invention.

FIG. 5 is a flowchart of a method 500 for displaying a portion of a map on a mobile device of a user while the user is traveling along a route according to embodiments of the present invention. Method 500 may be performed wholly or partially by a processor of the mobile device. A map application being executed on the processor may provide instructions for performing the method.

At block 510, the mobile device receives a selection of a route. As described herein, the route can be selected in various ways. For example, a user can speak a starting location and an ending location (e.g., by address or name) into a microphone, and an audio recognition routine running on the processor can interpret the words and communicate the locations with the map application. The map application can provide options to the user or just select one (e.g., based on criteria of distance or time driving).

At block 520, indicia of a plurality of map tiles along the route are identified, and map tiles that are at least partially within the perimeter of each marker can be identified. The identified map tiles are not within a currently selected view of the map being displayed on a display of the mobile device. The mobile device may store the map tiles of a current view, but map tiles identified for pre-loading would not be in the current view. The map tiles of the current view may be loaded in response to a user moving the virtual camera, but the map tiles identified for pre-loading are not downloaded in response to a user selecting a particular view.

In one embodiment, the indicia are indexes of the map tiles. For example, the indicia can specify the map tiles on a 2D grid, as is shown in FIG. 1. In another embodiment, the indicia could just be the route. The map server can know the locations of the road network, and thus the map server would know where the route lies by a specification of the streets, highways, etc. and the directions. Based on the route, the map server can then determine which map tiles are needed.

The map tiles may be obtained for a predetermined resolution of the map. Thus, in one embodiment, the pre-loaded map tiles may be of a same default resolution (e.g., a fixed height of the virtual camera above the 2D map). In various embodiments, the predetermined resolution could be set by a user, or may be mandated by the map application.

At block 530, a location of the mobile device relative to the route is identified. Examples of a location include "not started route" or a specific distance traveled along the route from a start of the route. The location can be determined by a location detector on the device, which may use GPS or other mechanisms (e.g., radio signals from phone network or from other networks). If the location of the mobile device indicates that the user has not started traveling along the route, then location relative to the route can be "not started." If the location shows that the user has started along the route, then how far along the route can be identified, e.g., as a percentage or a raw distance. In one embodiment, map tiles for the route already traveled are not retrieved.

At block 540, the mobile device sends a request to a map server for the identified map tiles. In one aspect, the request can be sent in response to less than a minimum amount of map tiles being stored in a memory of the mobile device. The minimum amount of tiles are determined for tiles corresponding to the route remaining to be traveled. For example, if the mobile device stores less than the next 25 Km of the route, a request for more map tiles along the route would be sent to the map server. The request can be for map tiles up to a maximum distance, e.g., 50 Km. As another example, if the user is at home on a Wi-Fi network and the mobile device is charging, then the number of tiles stored is zero and all of the map tiles can be downloaded (or at least up to a large maximum, e.g., 1,000 Km). The amount of map tiles could also be measured in the number of bytes, and other units of distance can be used.

At block 550, the mobile device receives the requested map tiles from the map server for displaying on the mobile device. The map tiles can be sent with information about where each map tile is located, e.g., indexes on a 2D grid or latitude and longitude. The map tiles can also include metadata regarding stores within the map tile, and any information related to the stores. A map tile can also include an index to denote which tile it is, and therefore where the tile should be displayed.

At block 560, the mobile device uses the received map tiles to render an image of a portion of the map. For example, a graphics processor can use information stored in the map tiles to render an image that is then output to a display on the mobile device.

C. Determining Tiles Along Route

The mobile device and/or the map server can determine which map tiles are along the route. Besides the map tiles that literally include a path of the route (e.g., a road passes through a grid corresponding to the map tile), map tiles that are near the route may be retrieved. How near a map tile has to be can be specified by a user, or be set by the map application. In one embodiment, locations can be identified along the route and map tiles within a perimeter around a location can be identified.

Figure 6:
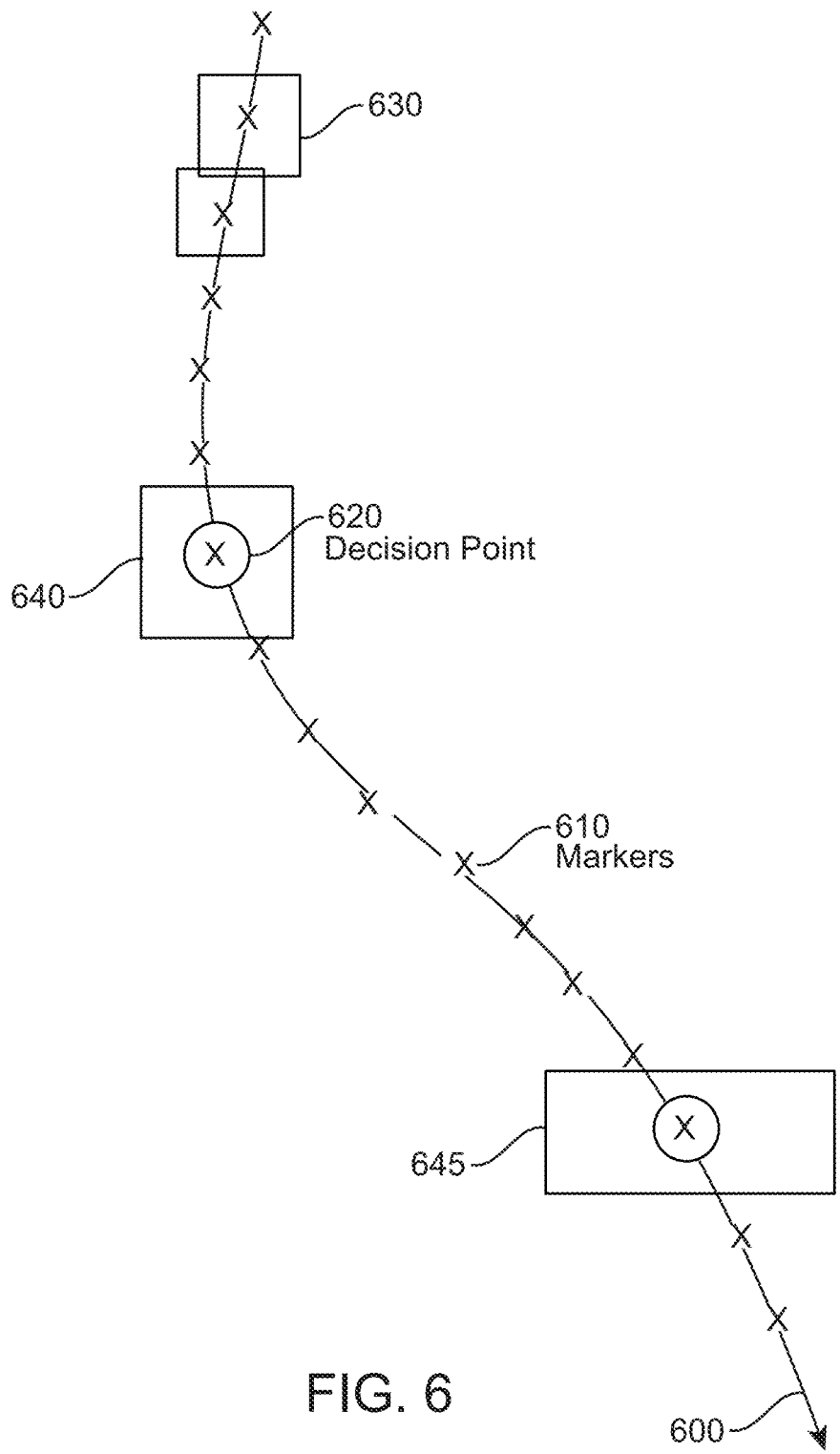
FIG. 6 shows markers along a route 600 for determining map tiles along the route according to embodiments of the present invention.

FIG. 6 shows markers along a route 600 for determining map tiles along the route according to embodiments of the present invention. Once the route is selected, markers 610 along the route can be determined, e.g., by the mobile device or the map server. The makers can include the starting point, and be positioned with a predetermined separation distance. For example, the separation distance can be 500 meters. In another embodiment, the separation distance can be determined dynamically, e.g., based on a density of intersecting roads.

A perimeter 630 can be determined around each marker. For example, a square can be centered around a marker. An example length of the square is the separation distance, e.g., 500 meters. Others shapes besides a square can be used, e.g., rectangles, circles, and the like. A length of the perimeter can be tied to the separation distance or may be determined independently.

Certain markers are decision points 620, which is where a driver is to change course based on the selected route, e.g., get on a freeway or make a turn. In one embodiment, a perimeter around the decision point is larger than the perimeter around the marker. As shown, perimeter 640 is larger than perimeter 630. The perimeter can also vary based on the type of decision point. For example, the perimeter 645 may be for an exit or entrance onto a freeway, and in such instances a mistake by a driver could take one far away from the route, and thus a larger perimeter would be desired.

Once the markers 610 (including decision points 620) are identified, map tiles that are at least partially within the perimeter of each marker are identified. Some of the perimeters may overlap, and thus certain map tiles could be included within more than one perimeter. But, such map tiles do not need to be loaded more than once. In one embodiment, the mobile device and/or the map server can keep track of which map tiles have been sent to the mobile device. If a map tile has already been sent, then it can be removed from another set of map tiles for sending to the mobile device. For example, if the perimeter for marker 1 at least partially covers tiles (A,B,C,D), then these four tiles can be retrieved by the mobile device. Then if marker 2 at least partially covers (C,D,E,F), then C and D would not be downloaded as they were already downloaded previously. If tiles were missed (e.g., tiles C and D were not downloaded due to a transmission error), then the tiles can be loaded. If the missed tiles are not still needed (e.g. if the mobile device has already passed the locations of the missed map tiles), then the loading of the missed map tiles can be skipped.

IV. Adaptive Loading Tiles Along Route

As described above, the tiles can be retrieved in blocks. For example, as a user travels along the route, the amount of map tiles of the route to be traveled becomes less. For example, if 50 Km of map tiles are stored, and then the user drives (with the mobile device) 10 Km, then 40 Km of map tiles of the route to be traveled (i.e. in front of the user) would be left. Once the amount of tiles drops below a specified value, the mobile device can request another block of tiles (e.g., map tiles up to 50 Km of the route ahead). The minimum amount of map tiles stored and the maximum amount of map tiles to be stored can depend on certain variables.

A. Variables for Determining when and how Much to Pre-Load

The mobile device can determine certain state variables and then use the current values to determine when and how much map tiles to retrieve. Example variables include a charging state of the mobile device, a network state, and a distance traveled along the route. The charging state can be either charging (e.g., plugged into a charging cable that is connected to a wall socket or a socket of a car) or not charging (e.g. running off a battery). There can be varying levels of charging, e.g., if different power sources provide different levels of charging. If a mobile device is not being charged, then the maximum amount of tiles to load may be less to conserver battery life, e.g., as the mobile device could be plugged in later.

The network state can relate to the type of network that the mobile device is connected and the strength of the connection. Different types of network include Wi-Fi, 2G, and 3G. the strength of the connection can be measured in number of bars of signal, or other gradations between a minimum and maximum signal strength. If the network is Wi-Fi, then a larger number of map tiles would be downloaded since the cost since the downloaded data would not be counted against a data plan limit for radio networks, such as 2G and 3G.

The distance traveled along the route can be used as a proxy for whether the user is committed to the trip, i.e. whether the user is actually going to complete the trip. For example, a user may change his/her mind about the trip if only a few miles have been traveled. Thus, it would be wasteful to download too many map tiles. However, if the user has traveled 200 Km into an 800 Km trip, it is unlikely the user will turn around or otherwise device from the route. In one embodiment, the committed-to-trip variable is binary, where if the distance traveled is above a threshold then the variable is "1", and otherwise is "0". Other proxies could be used, such as whether the user is accessing the map application to view parts of the route.

B. Example Table

FIG. 7 shows a table 700 illustrating different minimum and maximum amounts of map tiles to be stored based on three example variables according to embodiments of the present invention. The three variables are network state, charging state, and whether the user is committed to the route. The variables can be binary or have multiple values. As shown, the network state has four possible values, and the charging state and committed to route are both binary. For each combination of the variables, minimum and maximum amounts of tiles to be stored are displayed.

The network state is shown with four values of None, Bad, Good, and Wi-Fi. The distinction between Good and Bad can depend on the power usage per byte of data downloaded. None corresponds to no network connection, and thus the tiles to be stored is zero. It does not matter what the state is for the other two variables. A Bad value can, for example, be the result of a 2G connection or a 3G connection with low signal strength. In these cases, the amounts are lower. Trying to download data on a slow connection can use up a lot of battery life. For a Wi-Fi connection, the user typically does not pay per byte or have a limit, and thus the amounts are typically larger.

If the mobile device is charging, the battery will not be depleted when downloading the data. Thus, the amounts may be larger when the device is charging. When the user is committed to the route, the amounts are typically larger since the user will eventually drive through all parts of the route, and thus might eventually need any of the map tiles ahead. Accordingly, there is no need to delay downloading in case the user deviates. When the device downloads the map tiles in large chunks, the battery life is extended, as more power is used when the data is downloaded over many requests, as opposed to fewer requests from the mobile device to the map server.

One skilled in the art will appreciate that table 700 is just an example. A different emphasis on the tradeoffs between battery life and cost of downloading can vary. For example, the charging state may be similarly weighted as the committed to route variable.

C. Method

Figure 8:
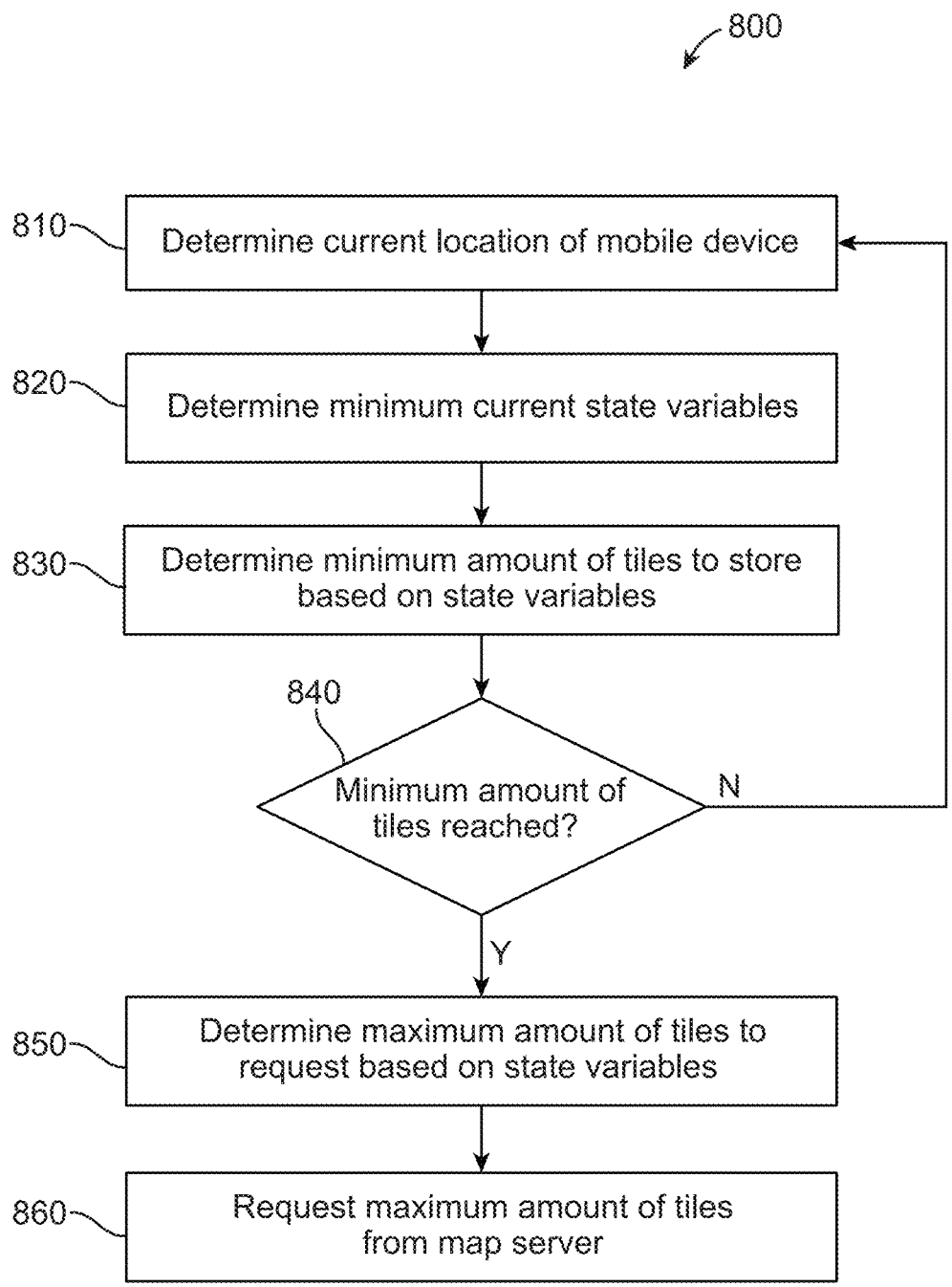
FIG. 8 is a flow chart of a method for determining when and an amount of map tiles to download according to embodiments of the present invention.

FIG. 8 is a flow chart of a method for determining when and an amount of map tiles to download according to embodiments of the present invention.

At block 810, the mobile device determines the current location. The location can be determined as described herein. The mobile device can be programmed to determine the location at periodic intervals, or at certain times. In one embodiment, the determination of the location at periodic intervals is only initiated when the user selects a start of a route of travel, e.g., a start of the directions.

At block 820, the current state variables are determined. For example, the mobile device can determine the number of miles traveled based on the current location by comparing to a start location. Whether or not the device is charging can be detected. The network state can be tested, for example, to identify the type of network, a signal strength, and/or a data rate of download (which can be measured by previous or current interactions with the map server or other server). In one embodiment, depending on the type of network, signal strength, and data rate, a classification of the network can be determined. The classifications can be those in table 700 or other classification, e.g., based on a numeric scale (such as 1-10).

At block 830, the minimum amount of tiles to be stored is determined. In one embodiment, a lookup table can be used. The entry that corresponds to the current state variables can be used to retrieve the corresponding minimum amount. In one embodiment, the minimum amount of map tiles to be stored for the remaining route is specified as a distance. In another embodiment, the minimum amount is specified in the number of bytes.

At block 840, the map application determines whether the minimum amount of tiles is reached. The mobile device can use the current location to determine whether the minimum amount of tiles is reached. The device can store a location of where the currently stored tiles end. This end location can be compared to the current location to determine if the minimum is reached. In another embodiment, the current location can be used to distinguish between tiles that in front of the user. These storage size of these tiles can be compared to a minimum amount. If the minimum amount is not reached, then the process reverts back to block 810.

At block 850, if the minimum amount of stored map tiles is reached, then the maximum amount of tiles to request is determined based on state variables. The state variables may be used in a similar manner as for determining the minimum amount.

At block 860, the mobile device sends a request to the map server for the maximum amount of tiles. In one embodiment, the request provides an end distance, which may, for example, be defined as a distance relative to the current location (which the map server can determine the coordinate) or as a specific coordinate on the map. In another embodiment, multiple requests can be sent, where each request is for map tiles in of a specified size. Then when the map tiles reach the maximum (as determined by size or the distance), the mobile device can stop issuing the requests.

The methods of pre-loading map tiles can also be applied to streaming content files, such as music or video files. For example, a music service can allow a mobile device to pre-load varying amount of the content in order to allow the mobile device to conserve battery life, reduce, costs associated with the downloading, and any other issues mentioned above. The corollary to the location of the user would be the part of the stream currently being played. The route would correspond to the channel being viewed or listened to, where the channel may be broadcast or tailored the individual based on a genre or a particular song. The channel would effectively be a list of audio or video files. For video, the list could be just one file that is being streamed. The committed to route variable would correspond to how long the user has been viewing or listening to the channel, which may be just one file. The amount of tiles would correspond to the amount of data, which could be measured in time or bytes for the audio/video files.

V. Mobile Device and Server

FIG. 9A is a simplified block diagram of an implementation of a device 900 according to an embodiment of the present invention. Device 900 can be a mobile device, a handheld device, a notebook computer, a desktop computer, or any suitable electronic device with a screen for displaying images and that is capable of communicating with a map server 950 as described herein. Device 900 includes a processing subsystem 902, a storage subsystem 904, a user input device 906, a user output device 908, a network interface 910, and a location/motion detector 912.

Processing subsystem 902, which can be implemented as one or more integrated circuits (e.g., e.g., one or more single-core or multi-core microprocessors or microcontrollers), can control the operation of device 900. In various embodiments, processing subsystem 902 can execute a variety of programs in response to program code and can maintain multiple concurrently executing programs or processes. At any given time, some or all of the program code to be executed can be resident in processing subsystem 902 and/or in storage subsystem 904.

Through suitable programming, processing subsystem 902 can provide various functionality for device 900. For example, processing subsystem 902 can execute a map application program (or "app") 916. Map app 916 can perform all or parts of methods described herein, such as determining when and how many map tiles to retrieve based on a selected route. Map app 916 can use tile locations 917 to determine which tiles to request and/or where retrieved tiles should be placed, e.g., based on an index.

Storage subsystem 904 can be implemented, e.g., using disk, flash memory, or any other storage media in any combination, and can include volatile and/or non-volatile storage as desired. In some embodiments, storage subsystem 904 can store one or more application programs to be executed by processing subsystem 902 (e.g., map app 916). In some embodiments, storage subsystem 904 can store other data (e.g., used by and/or defined by map app 916). Programs and/or data can be stored in non-volatile storage and copied in whole or in part to volatile working memory during program execution.

A user interface can be provided by one or more user input devices 906 and one or more user output devices 908. User input devices 906 can include a touch pad, touch screen, scroll wheel, click wheel, dial, button, switch, keypad, microphone, or the like. User output devices 908 can include a video screen, indicator lights, speakers, headphone jacks, or the like, together with supporting electronics (e.g., digital-to-analog or analog-to-digital converters, signal processors, or the like). A customer can operate input devices 906 to invoke the functionality of device 900 and can view and/or hear output from device 900 via output devices 908.

Network interface 910 can provide voice and/or data communication capability for device 900. For example, network interface 910 can provide device 900 with the capability of communicating with map server 950. In some embodiments network interface 910 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), and/or other components. In some embodiments network interface 910 can provide wired network connectivity (e.g., Ethernet) in addition to or instead of a wireless interface. Network interface 910 can be implemented using a combination of hardware (e.g., antennas, modulators/demodulators, encoders/decoders, and other analog and/or digital signal processing circuits) and software components.

Location/motion detector 912 can detect a past, current or future location of device 900 and/or a past, current or future motion of device 900. For example, location/motion detector 912 can detect a velocity or acceleration of mobile electronic device 900. Location/motion detector 912 can comprise a Global Positioning Satellite (GPS) receiver and/or an accelerometer. In some instances, processing subsystem 902 determines a motion characteristic of device 900 (e.g., velocity) based on data collected by location/motion detector 912. For example, a velocity can be estimated by determining a distance between two detected locations and dividing the distance by a time difference between the detections.

FIG. 9B is a simplified block diagram of an implementation of map server 950 according to an embodiment of the present invention. Map server 950 may be used for any map server mentioned herein. Map server 950 includes a processing subsystem 952, storage subsystem 954, a user input device 956, a user output device 958, and a network interface 960. Network interface 960 can have similar or identical features as network interface 910 of device 900 described above.

Processing subsystem 952, which can be implemented as one or more integrated circuits (e.g., a conventional microprocessor or microcontroller), can control the operation of map server 950. In various embodiments, processing subsystem 952 can execute a variety of programs in response to program code and can maintain multiple concurrently executing programs or processes. At any given time, some or all of the program code to be executed can be resident in processing subsystem 952 and/or in storage subsystem 954.

Through suitable programming, processing subsystem 952 can provide various functionality for map server 950. Thus, map server 950 can interact with map app 916 being executed on device 900 in order to provide map tiles to device 900. In one embodiment, map server 950 simply stores the map tiles 966, and sends them based on a request for a particular index, as identified by tile index 968. The map tiles can be stored in a location pointed to by the tile index 958 for quick retrieval. In other embodiments, map server 950 can determine the tiles to be sent based on route information, such as the directions including decision points for changing roads. However, such processing can become more difficult if map sever 950 supports many devices.

Storage subsystem 954 can be implemented, e.g., using disk, flash memory, or any other storage media in any combination, and can include volatile and/or non-volatile storage as desired. In some embodiments, storage subsystem 954 can store one or more application programs to be executed by processing subsystem 952. In some embodiments, storage subsystem 954 can store other data, such as map tiles 966 and tile index 968 (used to identify specific tiles). Programs and/or data can be stored in non-volatile storage and copied in whole or in part to volatile working memory during program execution.

A user interface can be provided by one or more user input devices 956 and one or more user output devices 958. User input and output devices 956 and 958 can be similar or identical to user input and output devices 906 and 908 of device 900 described above. In some instances, user input and output devices 956 and 958 are configured to allow a programmer to interact with map server 950. In some instances, map server 950 can be implemented at a server farm, and the user interface need not be local to the servers.

It will be appreciated that device 900 and map server 950 described herein are illustrative and that variations and modifications are possible. A device can be implemented as a mobile electronic device and can have other capabilities not specifically described herein (e.g., telephonic capabilities, power management, accessory connectivity, etc.). In a system with multiple devices 900 and/or multiple map servers 950, different devices 900 and/or map servers 950 can have different sets of capabilities; the various devices 900 and/or map servers 950 can be but need not be similar or identical to each other.

Further, while device 900 and map server 950 are described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Additionally, while device 900 and map server 950 are described as singular entities, it is to be understood that each can include multiple coupled entities. For example, map server 950 can include, a server, a set of coupled servers, a computer and/or a set of coupled computers.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

What is claimed is:

1. A method for displaying a portion of a map on a mobile device of a user while the user is traveling along a route, the method comprising:
   receiving, at the mobile device, a selection of a route;
   identifying, by the mobile device, indicia of a plurality of map tiles along the route;
   identifying, by the mobile device, a location of the mobile device relative to the route;
   identifying, by the mobile device, a plurality of markers along the route, the plurality of markers being identified based at least in part on road intersections along the route;
   for each particular marker of the plurality of markers:
      determining whether that particular marker is a decision point where the user is to change course or change roads based on the route,
      in response to determining that the particular marker is not a decision point, setting a first specified perimeter around the particular marker,
      in response to determining that the particular marker is a decision point, setting a second specified perimeter greater than the first specified perimeter around the particular marker, the second specified perimeter being based at least in part on a type of the decision point, wherein the type of the decision point is one of: a point where the user is to change roads by entering or exiting a freeway; or a point where the user is to change course by making a turn at a road intersection, and wherein the second specified perimeter around a point where the user is to change roads by entering or exiting a freeway is greater than the second specified perimeter around a point where the user is to change course by making a turn at a road intersection, and
      identifying map tiles that are at least partially within the perimeter set around the particular marker;
   sending, from the mobile device to a map server, a request for the identified map tiles; and
   receiving, at the mobile device from the map server, the requested map tiles for displaying on the mobile device.

2. The method of claim 1, wherein the plurality of markers are separated by a predetermined distance.

3. The method of claim 1, further comprising:
   using the received map tiles to render an image of a portion of the map.

4. The method of claim 1, wherein the map tiles are obtained for a predetermined resolution of the map.

5. The method of claim 1, wherein a number of map tiles identified and requested is variable and depends on at least one of:
   a charging state of the mobile device,
   a network state, and
   a distance traveled along the route.

6. The method of claim 1, wherein a minimum amount of map tiles to be stored for the remaining route is specified as a distance.

7. The method of claim 1, further comprising:
   when a minimum amount of stored map tiles is reached, sending a request for additional map tiles, the requested additional map tiles covering the route to be traveled up until a maximum amount of map tiles are stored.

8. The method of claim 7, wherein at least one of the minimum amount and the maximum amount is variable and depends on at least one of:
   a charging state of the mobile device,
   a network state, and
   a distance traveled along the route.

9. The method of claim 8, wherein the maximum amount is larger when the mobile device is plugged into an external power source than when the mobile device is not plugged into an external power source.

10. The method of claim 8, further comprising:
    increasing the maximum amount in response to determining that the distance traveled along the route is greater than a threshold.

11. The method of claim 8, wherein the maximum amount is larger when the network state corresponds to a local area connection than when the network state corresponds to a non-local area network connection.

12. The method of claim 11, wherein the local area connection is an Institute of Electrical and Electronics Engineers (IEEE) 802.11 standard.

13. The method of claim 8, wherein the maximum amount is larger when the network state corresponds to a higher bandwidth than when the network state corresponds to a lower bandwidth.

14. The method of claim 1, wherein the identified location includes one of:
    not started route or a specific distance traveled along the route from a start of the route.

15. The method of claim 1, wherein the indicia include indexes of map tiles.

16. The method of claim 1, wherein the indicia include a specification of the route.

17. A computer product comprising a non-transitory computer readable medium storing a plurality of instructions that when executed control a processor to display a portion of a map on a mobile device of a user while the user is traveling along a route, the instructions causing performance of operations comprising:
    receiving a selection of a route;
    identifying indicia of a plurality of map tiles along the route
    identifying a location of the mobile device relative to the route;
    identifying a plurality of markers along the route, the plurality of markers being identified based at least in part on road intersections along the route;
    for each particular marker of the plurality of markers:
       determining whether that particular marker is a decision point where the user is to change course or change roads based on the route,
       in response to determining that the particular marker is not a decision point, setting a first specified perimeter around the particular marker,
       in response to determining that the particular marker is a decision point, setting a second specified perimeter greater than the first specified perimeter around the particular marker, the second specified perimeter being based at least in part on a type of the decision point, wherein the type of the decision point is one of: a point where the user is to change roads by entering or exiting a freeway; or a point where the user is to change course by making a turn at a road intersection, and wherein the second specified perimeter around a point where the user is to change roads by entering or exiting a freeway is greater than the second specified perimeter around a point where the user is to change course by making a turn at a road intersection, and identifying map tiles that are at least partially within the perimeter set around the particular marker;

sending a request for the identified map tiles; and receiving the requested map tiles for displaying on the mobile device.

18. The computer product of claim 17, the operations further comprising:

using the received map tiles to render an image of a portion of the map.

19. The computer product of claim 17, wherein a number of map tiles identified and requested is variable and depends on at least one of:

a charging state of the mobile device, a network state, and a distance traveled along the route.

20. The computer product of claim 17, the operations further comprising:

when the minimum amount of stored map tiles is reached, sending a request for additional map tiles, the additional map tiles covering the route to be traveled up until a maximum amount of map tiles are stored.

21. The method of claim 20, wherein at least one of the minimum amount and the maximum amount is variable and depends on at least one of:

a charging state of the mobile device, a network state, and a distance traveled along the route.

22. An electronic device for displaying a portion of a map on a mobile device of a user while the user is traveling along a route, the electronic device comprising:

an input for receiving a selection of a route;

a storage subsystem that stores map tiles;

a network interface for communicating over a network with a map server that stores map tiles; and a processing subsystem configured to execute a map application by:

identifying indicia of a plurality of map tiles along the route;

identifying a location of the mobile device relative to the route;

identifying a plurality of markers along the route, the plurality of markers being identified based at least in part on road intersections along the route;

for each particular marker of the plurality of markers:

determining whether that particular marker is a decision point where the user is to change course or change roads based on the route, in response to determining that the particular marker is not a decision point, setting a first specified perimeter around the particular marker, in response to determining that the particular marker is a decision point, setting a second specified perimeter greater than the first specified perimeter around the particular marker, the second specified perimeter being based at least in part on a type of the decision point, wherein the type of the decision point is one of: a point where the user is to change roads by entering or exiting a freeway; or a point where the user is to change course by making a turn at a road intersection, and wherein the second specified perimeter around a point where the user is to change roads by entering or exiting a freeway is greater than the second specified perimeter around a point where the user is to change course by making a turn at a road intersection, and identifying map tiles that are at least partially within the perimeter set around the particular marker;

sending, from the mobile device to a map server, a request for the identified map tiles; and receiving, at the mobile device from the map server, the requested map tiles for displaying on the mobile device.

23. The method of claim 1, wherein types of decision points further include a point where the user is to change course by changing a mode of transportation.

* * * * *